3,214,283
PHOTOCHROMIC CEMENT
John A. Chopoorian, Stamford, Conn., assignor to American Cyanamid Company, Stamford, Conn., a corporation of Maine
No Drawing. Filed Dec. 31, 1962, Ser. No. 248,262
16 Claims. (Cl. 106—97)

This invention relates to novel cement compositions. More particularly, this invention relates to cement which has the ability to change color or darken upon contact with ultraviolet light. Still more particularly, this invention relates to cement, mortar or concrete compositions having incorporated therein various admixtures or reaction products of certain inorganic metal oxides and a method for the production thereof.

Cement, mortar, concrete etc. are a group of well known and widely used building materials. They have been used for many years for a multitude of purposes. Generally concrete is prepared by forming a water, cement and aggregate mixture, putting it into place and allowing it to set or harden. There have been many attempts made to discover a method of reducing the glare of concrete articles such as, for example, roads, patios, swimming pools, etc. Among these have been the addition of such additives as water based pigments at concentrations sufficient to give a slightly darkened surface for reducing daylight glare but light enough for good road visibility at night. The effect has been somewhat disappointing in that generally to produce a concrete structure of low glare, concentrations must be so high as to produce structures which are too dark in the evening for safe use.

I have discovered a cement composition which darkens when in contact with ultraviolet light, especially that resulting from the rays of the sun, and returns to its normal white or grayish color upon removal of said rays, i.e. during cloudiness, in shade or in the evening, thus being extremely applicable for use in roadways and the like, the whiter the cement used, the greater the effect manifested. Additionally, the cement compositions possess an aesthetic use. The color to which the composition changes can be varied so that such surfacings as patio floors, and walls, etc., swimming pools, structures erected with concrete blocks and the like change their appearance during the day as contrasted with the evening.

It is therefore an object of the instant invention to present novel cement compositions.

It is a further object of the instant invention to present cement which as the ability to change color or darken upon being contacted with ultraviolet light.

It is a further object of the instant invention to present cement, mortar or concrete compositions having incorporated therein various admixtures or reaction products of certain inorganic metal oxides and a method for the production thereof.

By my invention it has been found that cement compositions may be prepared which compositions possess the unusual ability to change color upon contact with the rays of the sun.

The color-changing additives of this invention are certain metal oxide photochromic materials.

Photochromic materials are known and have been used as the active ingredients in such articles as data storage devices, reflectants for incident radiation, photochemical printing and the like. There has, however, to my knowledge been no disclosure of the production of cement compositions comprising highly stable, very sensitive, rapid color-changing photochromic materials uniformly dispersed therein.

I have now discovered that certain metal oxide photochromic materials may be directly and uniformly incorporated into cement by physically blending or admixing the cement with the photochromic material. It was indeed surprising and unexpected to find that the photochromic inorganic oxides still functioned as efficiently in the cement as in the solid uncombined state. It is well known that may solid inorganic photochromic materials which change their color in the solid state, do not continue to function as photochromic materials after having been added to a solid material. For example, $TiO_2$ doped with an iron oxide functions as a photochromic material in the pure solid state, however, upon incorporation thereof into solid glass, will not change color upon contact with ultarviolet rays.

However, I have discovered novel compositions of matter comprising cement containing certain photochromic materials comprising inorganic metal oxides which continue to function as photochromic materials upon contact with irradiation, i.e. ultraviolet light.

Molecules or complexes which undergo reversible photo-induced color changes are termed photochromic systems. That is to say, in the absence of activating radiation, the system has a single stable electronic configuration with a characteristic absorption spectrum. When the system is contacted with ultraviolet irradiation the absorption spectrum for the system changes drastically, but when the irradiation source is removed, the system reverts to its original state.

Photochromism has been observed in inorganic and organic compounds both in solution and solid state. Although the exact mechanism of color change varies in each individual system, in many inorganic systems it can be related to one of two possible reaction schemes. The first process is the alteration of the force field around the nucleus of a coordination compound by photo-initiated dissociation, ligand exchange, or isomerization. This alteration can lead to a marked change in the light absorption properties of a molecule.

The second fundamental photo-electronic mechanism generally considered as producing photochromism is electron delocalization. This mechanism is rapidly reversible in organic molecules and therefore usually produces no colored intermediate. However, in inorganic crystals, photo-initiated electron delocalization from an impurity can lead to a colored state in which the electron is either trapped by a crystal defect to form a color center or otherwise reacts with the crystal host to leave the system in a colored state.

By the terms "photochromic compound," "photochromic substance" or "photochromic material," as used in the instant disclosure, is meant compounds, substances or materials which change their transmission or reflectance upon being subjected to ultraviolet or visible irradiation and subsequently revert to their original state upon subjection thereto of a different wavelength of radiation or removal of the initial ultraviolet source.

The ability of various materials to change color and to then revert back to their original color is not a new phenomena. In fact, such compounds have been widely used in various ways, as described above. Generally, these compounds change their color when exposed to ordinary sunlight and revert back to their original color upon removal thereof from the rays of the sun. Various other materials, however, change color only when subjected to a certain degree of irradiation, and as such, sunlight will not effect them. High intensity radiation, such as 10–25 cal./cm.$^2$/sec. or more is necessary in regard to these compounds, while sunlight (0.2 cal./cm.$^2$/sec.) will affect the former.

I have discovered a group of photochromic materials which may be incorporated into cement thereby forming the novel compositions of the present invention having the several advantages mentioned above.

These photochromic materials are admixtures of inorganic metal oxides. The admixtures generally consist of a primary or host inorganic metal oxide doped with a lesser or contaminating amount of another guest inorganic metal oxide. The admixtures which are contemplated as useful in the novel compositions of my invention are the following: $TiO_2$ doped with $Fe_2O_3$, FeO, $Cr_2O_3$, CuO, NiO, $MnO_2$ or $Mn_2O_3$; $Nb_2O_5$ doped with $Fe_2O_3$, FeO, $Cr_2O_3$, CuO, $V_2O_5$, $MnO_2$ or $Mn_2O_5$; $Al_2O_3$ doped with $Cr_2O_3$ or $V_2O_5$; ZnO doped with CuO or $V_2O_5$; $SnO_2$ doped with CuO; or $ZrO_2$ doped with CuO or NiO. In regard to the $TiO_2$, the rutile form of the compound is sufficient, however, the anatase form containing at least 5% of the rutile material is preferred. These admixtures contain from about 0.01 to 5.0 mole percent of the doping guest oxide, preferably 0.1 to 2.0 mole percent, based on the number of moles of the host oxide.

These doped oxides are well known in the art and generally may be prepared by any applicable method. Various methods which may be used include those set out in the following articles. Williamson, Nature (London), 140, 238 (1937); McTaggert et al., J. Appl. Chem., 5, 643 (1955); Frydryck, Doctoral Thesis, Free University of Berlin (1961), and the method set forth hereinbelow.

I have also discovered a second group of photochromic materials that may be employed in the present invention. The second group comprises admixtures of $TiO_2$ with a combination of two doping (guest) metal oxides. I have found that these mixtures of guest oxides, in admixture with $TiO_2$, exhibit a more pronounced effect in the color intensity of the products than either doping metal (guest) oxide used alone. For example, $TiO_2$ doped with $Fe_2O_3$ or FeO and NiO or $TiO_2$ doped with $Fe_2O_3$ or FeO and CuO, result in a more intense color change than $TiO_2$ doped with $Fe_2O_3$, FeO, NiO or CuO, alone. That is to say, a synergistic effect is observed wherein the results obtained utilizing a mixture of guest oxides is better than that obtained from either guest oxide alone or the mere additive results of both together. Here, again, the rutile form of the host compound is satisfactory, but the anatase form containing at least 5% of the rutile material is preferred. When a combination of the different doping oxides are used, amounts ranging from 100:1 to 10:1, preferably 25:1 to 5:1, of the iron oxide to the nickel or copper oxide are satisfactory, the total amount of the mixed oxides still however, being within the range (in mole percent) specified above in regard to the first group of photochromic additives.

These admixtures of host and guest oxides, either, as such, or with combinations of doping guest oxides, may be prepared, among other methods, by slurrying a solution of the doping metal oxide salt, the guest metal oxide itself, or mixtures thereof, with the host metal oxide. The slurry is evaporated and ground, then calcined at a temperature between 400° and 1100° C. to give the active admixture. In the case of $TiO_2$, the host crystalline compound desired can be previously prepared, or starting the admixture preparation with anatase, the desired final proportion of rutile can be controlled by the length of time the admixture is calcined above the phase transition temperature (ca. 800° C.). The final active admixtures are not merely mechanical or physical blends, but are crystalline materials consisting of a host material matrix wherein is contained substitutionally or interstitially, the doping guest metal oxide.

I have also discovered another group of photochromic inorganic oxide admixtures which may be used in the compositions of the present invention. A specific example of this third class of materials is $TiO_2$ reacted with $MoO_3$ or $WO_3$. These admixtures are produced in mole ratios of about 1 to 15 mole percent of $TiO_2$ to about 25 to 1 mole percent of $MoO_3$ or $WO_3$. The preferred mole ratios range from about 1:4 to about 12:1, respectively. The $TiO_2$ component may be in either the rutile, anatase, or mixed phase form, and may be replaced by the following metal oxide components: ZnO, $ZrO_2$, $SnO_2$ and $GeO_2$ in the same mole ratio given above for $TiO_2$.

These two phase materials constituting the third class of photochromic materials are prepared as described and claimed in copending application, Serial No. 239,159, filed November 21, 1962. In a typical procedure, the compounds are prepared by dissolving the $MoO_4$ or $WO_3$ in an aqueous basic solution and adding to this solution an acidified aqueous slurry or solution of the primary metal oxide component. After heating at up to 95° C. for several hours or longer, the desired active material is formed in a very high yield, separated from the solvent, washed free of acid, and dried.

Superficially taken, it would appear that the third class of materials are merely a mechanical or physical mixture of the two oxide components. However, these latter chemically prepared coprecipitated materials are of extremely great photo-sensitivity in comparison to a mixture of their individual metal oxides. Additionally, X-ray evidence clearly indicates that the crystalline matrix of the $MoO_3$ or $WO_3$ has been completely altered. Although not wishing to be bound by any particular theory it is possible that this phenomena can be explained as follows. Since the photochromic color in these compounds is blue, the most likely theoretical alternatives as to the nature of this photochromic reaction is that a net electron delocalization to Mo or W takes place either by an inter- or intra-phase photoinitiated electron transfer from the second component of the active material.

The amount of photochromic material added to the cement ranges from about 10%, by weight, to 50%, by weight, based on the weight of the cement used, and generally depending upon the intensity of the color desired. At concentrations below about 10%, color change is not marked enough so as to be of any substantial aesthetic or glare-reducing value. At concentrations above about 50%, the added photochromic material tends to interfere with the crystallization of the cement during the setting thereof and thereby increases the settting time etc. when applying it. A preferred range of photochromic additive has been found to be about 20–40%, by weight, based on the weight of the cement.

The method of preparing the cement compositions of the present invention is not critical and generally any standard method for making concrete, mortar etc. may be used. The photochromic additive may be added as a solid to the cement itself to result in a composition which may be used in any way cement is employed, e.g. to produce concrete with the addition of water and aggregate thereto. Alternatively, the photochromic material may be added to a prepared cement, water, aggregate mixture in the solid or liquid state. Conveniently, the cement, photochromic additive, sand, gravel, etc. are admixed in the dry state and sufficient water is added to produce a concrete mixture of desired consistency or workability. The order to addition of the concrete components therefore is governed more by the working conditions existing at the time of preparation of the concrete than any other factor, as any order of addition is satisfactory.

If the photochromic additive and cement are to be employed in the production of concrete or mortar by admixture with mineral aggregate, such as sand, gravel, crushed stone or mixtures thereof, the cement will ordinarily constitute in accordance with conventional practice, about 15–30% of the weight of the mineral aggregate.

The term "cement," as used herein, includes hydraulic cement, such as the kind of product obtained by mixing and grinding a calcareous material, i.e. limestone, marl, chalk, etc., with an argillaceous one, i.e. clay, shale, $Al_2O_3 \cdot SiO_2$ etc. and heating it to 1350–1800° C. until it begins to vitrify. The clinker thus obtained is pulverized, generally mixed with gypsum and ground. Various additives may be included, of course, in accordance with conventional procedures, such as disclosed for example in U.S. Patents 2,948,699 and 3,043,790. It is also within the scope of the present invention, to use various cements such as those commonly known as calcium-aluminate cements, as equivalents for the cement described above.

The cement compositions of the present invention as well as being applicable for the production of structures made entirely or in part of the cement mixture itself, may also be applied as a paint for application to stucco, cinder block, cement block, plaster, concrete, wood, etc. or as structures or objects, as discussed above, which are produced from conventional cements.

Various ultraviolet light absorbers may also be incorporated into the cement compositions of the present invention by any convenient means. In this manner the life of the photochromic additive may be lengthened by preventing an extraneous amount of ultraviolet light from coming into contact with the photochromic material. Amounts of ultraviolet light absorbers ranging up to about 20%, by weight, of the cement, may be used for this purpose.

The following examples are set forth for purposes of illustration only and are not meant to be construed as limitations on the present invention except as set forth in the appended claims. All parts and percentages are by weight unless otherwise specified.

EXAMPLE 1

To 500 parts of Portland cement are added 1500 parts of Ottawa sand and 100 parts of $TiO_2$ activated by 0.2% $Fe_2O_3$. The components are thoroughly dry mixed and sufficient water is then added to produce a workable concrete composition. The resultant concrete is formed into a slab 36" x 36" and allowed to set. Upon contact of the slab with sunlight, it turns deep tan. The sun-glare off the slab is substantially reduced in comparison to a slab made from concrete containing no photochromic material. The slab returns to its original off-white color upon removing it from the rays of the sun.

EXAMPLE 2

To 500 parts of Portland cement are added 100 parts of $TiO_2$ activated by 0.2% $Fe_2O_3$ and 0.02% CuO, and sufficient water to produce a sprayable cement mix. The mix is sprayed onto a cement block patio wall and allowed to harden. Upon contact with the sun, the wall turns a deep tan. The cement paint exhibits excellent adherence and returns to its normal off-white color when the rays of the sun no longer shine upon it.

EXAMPLE 3

Following the procedure of Example 2, a cement mix is prepared utilizing 250 parts of $TiO_2 \cdot 12WO_3$ (produced by reacting one mole of $TiO_2$ with 12 moles of $WO_3$ as described in application Serial No. 239,159). A rough concrete base in coated with the mix which is then allowed to harden. Upon contact with ultraviolet light of 400 m$\mu$ wavelength, the base turns deep blue-green and reverts to its original color when the light is removed.

The following table indicates the color change realized when various cement mixes are produced utilizing various other photochromic additives of the present invention.

*Table I*

| Example | Photochromic additive | Conc., percent by wt.* | Item produced from cement | Color change |
| --- | --- | --- | --- | --- |
| 4 | $TiO_2 + Fe_2O_3 + NiO$ | 25 | Paint | White to tan. |
| 5 | $TiO_2 \cdot 6WO_3$ | 35 | Concrete block. | Faint yellow to deep blue-green. |
| 6 | $TiO_2 \cdot 12MoO_3$ | 10 | do | White to deep blue. |
| 7 | $ZnO \cdot 6WO_3$ | 15 | Concrete slab. | Faint yellow to deep blue-green. |
| 8 | $TiO_2 + FeO$ | 20 | Coating on stucco. | Off-white to tan. |
| 9 | $TiO_2 + Cr_2O_3$ | 25 | Concrete block. | Off-white to light tan. |
| 10 | $TiO_2 + CuO$ | 40 | do | Do. |
| 11 | $TiO_2 + NiO$ | 45 | do | Do. |
| 12 | $TiO_2 + MnO_2$ | 25 | do | Do. |
| 13 | $TiO_2 + Mn_2O_3$ | 15 | do | Do. |
| 14 | $TiO_2 + Fe_2O_3 + NiO$ | 20 | do | Off-white to deep tan. |
| 15 | $TiO_2 + FeO + NiO$ | 10 | do | Do. |
| 16 | $TiO_2 + FeO + CuO$ | 18 | do | Off-white to brown. |
| 17 | $Nb_2O_5 + Fe_2O_3$ | 27 | do | Off-white to grey. |
| 18 | $Nb_2O_5 + FeO$ | 43 | do | Do. |
| 19 | $Nb_2O_5 + Cr_2O_3$ | 36 | do | Do. |
| 20 | $Nb_2O_5 + CuO$ | 20 | do | Do. |
| 21 | $Nb_2O_5 + V_2O_5$ | 15 | do | Do. |
| 22 | $Nb_2O_5 + MnO_2$ | 40 | do | Do. |
| 23 | $Nb_2O_5 + Mn_2O_5$ | 25? | do | Do. |
| 24 | $Al_2O_3 + Cr_2O_3$ | 45 | do | Do. |
| 25 | $Al_2O_3 + V_2O_5$ | 50 | do | Do. |
| 26 | $ZnO_2 + CuO$ | 30 | do | Do. |
| 27 | $ZnO_2 + V_2O_5$ | 30 | do | Do. |
| 28 | $SnO_2 + CuO$ | 30 | do | Off-white to deep tan. |
| 29 | $ZrO_2 + CuO$ | 30 | do | Off-white to grey. |
| 30 | $ZrO_2 + NiO$ | 30 | do | do |
| 31 | $TiO_2 \cdot 12WO_3$ | 30 | do | Faint yellow to blue-green. |
| 32 | $TiO_2 \cdot 12WO_3$ | 30 | do | Faint yellow to deep blue-green. |
| 33 | $ZnO \cdot 6MoO_3$ | 30 | do | White to light blue. |
| 34 | $ZrO_2 \cdot 12MoO_3$ | 40 | do | Do. |
| 35 | $ZrO_2 \cdot 6WO_3$ | 40 | do | Faint yellow to light blue-green. |
| 36 | $SnO_2 \cdot 12MoO_5$ | 40 | do | White to light blue. |
| 37 | $SnO_2 \cdot 6WO_3$ | 10 | do | Faint yellow to light blue-green. |
| 38 | $GeO_2 \cdot 12WO_3$ | 10 | do | Do. |
| 39 | $GeO_2 \cdot 6MoO_3$ | 25 | do | White to light blue. |

*Based on the weight of cement employed.

In Table I the effectiveness of the color change of the various photochromic additives of the instant invention are shown. In each example where doping oxides are used the photochromic additive was incorporated into the cement in concentrations of doping or activating oxides and admixtures thereof as shown in Examples 1 and 2. When the oxide reaction products were used, the method of preparation thereof set forth in Example 3, was employed.

I claim:
1. Hydraulic cement in admixture with from 10% to about 50% by weight, based on the weight of the cement, of an inorganic photochromic material selected from the group consisting of (A) $TiO_2$ doped with an oxide selected from the group consisting of $Fe_2O_3$, FeO, $Cr_2O_3$, CuO, NiO, $MnO_2$, $Mn_2O_3$, a mixture of $Fe_2O_3$ and NiO, a mixture of $Fe_2O_3$ and CuO, a mixture of FeO and NiO and a mixture of FeO and CuO, (B) $Nb_2O_5$ doped with an oxide selected from the group consisting of $Fe_2O_3$, FeO, $Cr_2O_3$, CuO, $V_2O_5$, $MnO_2$, and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, (F) $ZrO_2$ doped with an oxide selected from the group consisting of CuO and NiO, (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZrO_3$ reacted with an oxide selected from the group consisting of $MoO_3$ and $WO_3$, (J) $SnO_2$ reacted with an oxide selected from the group consisting of $MoO_3$ and $WO_3$ and (K) $GeO_2$ reacted with an oxide selected from the group consisting of $MoO_3$ and $WO_3$.

2. Hydraulic cement in admixture with from about 10% to about 50%, by weight, based on the weight of the cement, of a photochromic material selected from the group consisting of (A) $TiO_2$ doped with an oxide selected from the group consisting of $Fe_2O_3$, FeO, $Cr_2O_3$, CuO, NiO, $MnO_2$ and $Mn_2O_3$, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, and (F) $ZrO_2$ doped with an oxide selected from the group consisting of CuO and NiO.

3. Hydraulic cement in admixture with from about 10% to about 50%, by weight, based on the weight of the cement, of a photochromic material selected from the group consisting of (G) $TiO_2$ reacted with an oxide selected from the group consisting of $MoO_3$, and $WO_3$, (H) ZnO reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_3$ and $WO_3$ and (K) $GeO_2$ reacted with an oxide selected from the group consisting of $MoO_3$ and $WO_3$.

4. Hydraulic cement in admixture with from about 10% to about 50%, by weight, based on the weight of the cement, of an inorganic photochromic material selected from the group consisting of (a) $TiO_2$ doped with a mixture of $Fe_2O_3$ and NiO, (b) $TiO_2$ doped with a mixture of $Fe_2O_3$ and CuO, (c) $TiO_2$ doped with a mixture of FeO and NiO, and (d) $TiO_2$ doped with a mixture of FeO and CuO.

5. An hydraulic cement composition consisting essentially of a mixture of cement, a mineral aggregate and from about 10% to about 50%, by weight, based on the weight of the cement, of an inorganic photochromic material selected from the group consisting of (A) $TiO_2$ doped with an oxide selected from the group consisting of $Fe_2O_3$, FeO, $Cr_2O_3$, CuO, NiO, $MnO_2$, $Mn_2O_3$, a mixture of $Fe_2O_3$ and NiO, a mixture of $Fe_2O_3$ and CuO, a mixture of FeO and NiO and a mixture of FeO and CuO, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, (F) $ZrO_2$ doped with an oxide selected from the group consisting of CuO and NiO, (G) $TiO_2$ reacted with an oxide selected from the group consisting of $MoO_3$, and $WO_3$, (H) ZnO reacted with an oxide selected from the group consisting of $MoO_3$ and $WO_3$, (I) $ZrO_3$ reacted with an oxide selected from the group consisting of $MoO_3$and $WO_3$, (J) $SnO_2$ reacted with an oxide selected from the group consisting of $MoO_3$ and $WO_3$, and (K) $GeO_2$ reacted with an oxide selected from the group consisting of $MoO_3$ and $WO_3$.

6. An hydraulic cement composition consisting essentially of a mixture of cement, a mineral aggregate and from about 10% to about 50%, by weight, based on the weight of the cement, of a photochromic material selected from the group consisting of (A) $TiO_2$ doped with an oxide selected from the group consisting of $Fe_2O_3$, FeO, $Cr_2O_3$, CuO, NiO, $MnO_2$ and $Mn_2O_3$, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$, and $V_2O_5$, (D) $ZnO_2$ doped with an oxide selected from the group consisting of CuO and $V_2O_5$, (E) $SnO_2$ doped with CuO, and (F) $ZrO_2$ doped with an oxide selected from the group consisting of CuO and NiO.

7. An hydraulic cement composition consisting essentially of a mixture of cement, a mineral aggregate and from about 10% to about 50%, by weight, based on the weight of the cement, of a photochromic material selected from the group consisting of (G) $TiO_2$ reacted with an oxide selected from the group consisting of $MoO_3$, and $WO_3$, (H) ZnO reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_3$ and $WO_3$, and (K) $GeO_2$ reacted with an oxide selected from the group consisting of $MoO_3$ and $WO_3$.

8. An hydraulic cement composition consisting essentially of a mixture of cement, a mineral aggregate and from about 10% to about 50%, by weight, based on the weight of the cement, of an inorganic photochromic material selected from the group consisting of (a) $TiO_2$ doped with a mixture of $Fe_2O_3$ and NiO, (b) $TiO_2$ doped with a mixture of $Fe_2O_3$ and CuO, (c) $TiO_2$ doped with a mixture of FeO and NiO, and (d) $TiO_2$ doped with a mixture of FeO and CuO.

9. A method of making a photochromic cement which consists essentially of intimately mixing hydraulic cement with from about 10% to about 50%, by weight, based on the weight of the cement, of an inorganic photochromic material selected from the group consisting of (A) $TiO_2$ doped with an oxide selected from the group consisting of $Fe_2O_3$, FeO, $Cr_2O_3$, CuO, NiO, $MnO_2$, $Mn_2O_3$, a mixture of $Fe_2O_3$, and NiO, a mixture of $Fe_2O_3$ and CuO, a mixture of FeO and NiO and a mixture of FeO and CuO, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, (F) $ZrO_2$ doped with an oxide selected from the group consisting of CuO and NiO, (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZrO_3$, reacted with an oxide selected from the group consisting of $MoO_3$ and $WO_3$, (J) $SnO_2$ reacted with an oxide selected from the group consisting of $MoO_3$ and $WO_3$, and (K) $GeO_2$ reacted with an oxide selected from the group consisting of $MoO_3$ and $WO_3$.

10. A method of making a photochromic cement which consists essentially of intimately mixing hydraulic cement with from about 10% to about 50%, by weight, based on the weight of the cement, of a photochromic material selected from the group consisting of (A) $TiO_2$ doped with an oxide selected from the group consisting of $Fe_2O_3$, FeO, $Cr_2O_3$, CuO, NiO, $MnO_2$ and $Mn_2O_3$, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, and (F) $ZrO_2$ doped with an oxide selected from the group consisting of CuO and NiO.

11. A method of making a photochromic cement which consists essentially of intimately mixing hydraulic cement with from about 10% to about 50%, by weight, based on the weight of the cement, of a photochromic material selected from the group consisting of (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_3$ and $WO_3$, and (K) $GeO_2$ reacted with an oxide selected from the group consisting of $MoO_3$ and $WO_3$.

12. A method of making a photochromic cement which consists essentially of intimately mixing hydraulic cement with from about 10% to about 50%, by weight, based on the weight of the cement, of an inorganic photochromic material selected from the group consisting of (a) $TiO_2$ doped with a mixture of $Fe_2O_3$ and NiO, (b) $TiO_2$ doped with a mixture of $Fe_2O_3$ and CuO, (c) $TiO_2$ doped with a mixture of FeO and NiO, and (d) $TiO_2$ doped with a mixture of FeO and CuO.

13. A method of making a photochromic concrete which consists essentially of intimately mixing hydraulic cement, a mineral aggregate and from about 10% to about 50%, by weight, based on the weight of the cement, of an inorganic photochromic material selected from the group consisting of (A) $TiO_2$ doped with an oxide selected from the group consisting of $Fe_2O_3$, FeO, $Cr_2O_3$, CuO, NiO, $MnO_2$, $Mn_2O_3$, a mixture of $Fe_2O_3$ and NiO, a mixture of $Fe_2O_3$ and CuO, a mixture of FeO and NiO and a mixture of FeO and CuO, (B) $Nb_2O_5$ doped with an oxide selected from the group consisting of $Fe_2O_3$, FeO, $Cr_2O_3$, CuO, $V_2O_5$, $MnO_2$, and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, (F) $ZrO_2$ doped with an oxide selected from the group consisting of CuO and NiO, (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZrO_3$ reacted with an oxide selected from the group consisting of $MoO_3$ and $WO_3$, (J) $SnO_2$ reacted with an oxide selected from the group consisting of $MoO_3$ and $WO_3$, and (K) $GeO_2$ reacted with an oxide selected from the group consisting of $MoO_3$ and $WO_3$ with sufficient water to produce a concrete mixture of desired consistency and setting the resultant mixture to a hardened state.

14. A method of making a photochromic concrete which consists essentially of intimately mixing hydraulic cement, a mineral aggregate and from about 10% to about 50%, by weight, based on the weight of the cement, of a photochromic material selected from the group consisting of (A) $TiO_2$ doped with an oxide selected from the group consisting of $Fe_2O_3$, FeO, $Cr_2O_3$, CuO, NiO and $MnO_2$ and $Mn_2O_3$, (B) $Nb_2O_5$ doped with an oxide selected from the group consisting of $Fe_2O_3$, FeO, $Cr_2O_3$, CuO, $V_2O_5$, $MnO_2$ and $Mn_2O_5$, (C) $Al_2O_3$ doped with an oxide selected from the group consisting of $Cr_2O_3$ and $V_2O_5$, (D) $ZnO_2$ doped with an oxide selected from the group consisting of CuO and $V_2O_5$, (E) $SnO_2$ doped with CuO, and (F) $ZrO_2$ doped with an oxide selected from the group consisting of CuO and NiO with sufficient water to produce a concrete mixture of desired consistency and setting the resultant mixture to a hardened state.

15. A method of making a photochromic concrete which consists essentially of intimately mixing hydraulic cement, a mineral aggregate and from about 10% to about 50%, by weight, based on the weight of the cement, of a photochromic material selected from the group consisting of (G) $TiO_2$ reacted with an oxide selected from the group consisting of $MoO_3$ and $WO_3$, (H) ZnO reacted with an oxide selected from the group consisting of $MoO_3$ and $WO_3$, (I) $ZrO_2$ reacted with an oxide selected from the group consisting of $MoO_3$ and $WO_3$, (J) $SnO_2$ reacted with an oxide selected from the group consisting of $MoO_3$ and $WO_3$, and (K) $GeO_2$ reacted with an oxide selected from the group consisting of $MoO_3$ and $WO_3$ with sufficient water to produce a concrete mixture of desired consistency and setting the resultant mixture to a hardened state.

16. A method of making a photochromic concrete which consists essentially of intimately mixing hydraulic cement, a mineral aggregate and from about 10% to about 50%, by weight, based on the weight of the cement, of an inorganic photochromic material selected from the group consisting of (a) $TiO_2$ doped with a mixture of $Fe_2O_3$ and NiO, (b) $TiO_2$ dope with a mixture of $Fe_2O_3$ and CuO, (c) $TiO_2$ doped with a mixture of FeO and NiO, and (d) $TiO_2$ doped with a mixture of FeO and CuO with sufficient water to produce a concrete mixture of desired consistency and setting the resultant mixture to a hardened state.

References Cited by the Examiner

UNITED STATES PATENTS 2,092,838   9/37   Gardner _____ 106—97

OTHER REFERENCES

Lea and Desch: The Chemistry of Cement and Concrete, Edward Arnold Ltd., London, 1956, 2nd edition, pages 461–463, 480, 481.

Lea and Desch: "The Chemistry of Cement and Concrete," 1935, published by Edward Arnold and Company, London, pages 322–324.

McTaggart et al.: "Phototropic Effects in Oxides," Journal of Applied Chemistry, Dec. 5, 1955, pages 643–653.

McTaggart et al.: "Phototropic Effects in Oxides," Journal of Applied Chemistry, Jan. 8, 1958, pages 72–76, TOBIAS E. LEVOW, *Primary Examiner.*